United States Patent
Dopilka et al.

(10) Patent No.: US 9,848,127 B2
(45) Date of Patent: Dec. 19, 2017

(54) SYSTEM AND METHOD FOR A COMPACT DISPLAY

(71) Applicant: HONEYWELL INTERNATIONAL INC., Morristown, NJ (US)

(72) Inventors: David J. Dopilka, Glendale, AZ (US); Bernard Fritz, Eagan, MN (US); Brent D. Larson, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 168 days.

(21) Appl. No.: 14/798,674

(22) Filed: Jul. 14, 2015

(65) Prior Publication Data

US 2017/0019602 A1 Jan. 19, 2017

(51) Int. Cl.
G02B 27/14 (2006.01)
H04N 5/232 (2006.01)
G02B 27/01 (2006.01)

(52) U.S. Cl.
CPC ..... *H04N 5/23293* (2013.01); *G02B 27/0101* (2013.01); *G02B 2027/0112* (2013.01); *G02B 2027/0123* (2013.01)

(58) Field of Classification Search
CPC ............ H04N 5/23293; G02B 27/0101; G02B 27/017; G02B 27/0172; G02B 27/01; G02B 2027/0178; G02B 2027/0127; G02B 2027/0123; G02B 2027/011; G02B 2027/0145; G02B 23/125; G02B 17/008
USPC .............. 345/7, 8; 359/13, 630, 900; 349/11
See application file for complete search history.

(56) References Cited

U.S. PATENT DOCUMENTS

| | | | |
|---|---|---|---|
| 4,153,913 A | 5/1979 | Swift | |
| 4,156,292 A | 5/1979 | Helm et al. | |
| 4,269,476 A | 5/1981 | Gauthier et al. | |
| 4,722,101 A | 2/1988 | Blower | |
| 4,722,601 A | 2/1988 | McFarlane | |
| 4,743,200 A | 5/1988 | Welch et al. | |
| 4,842,224 A | 6/1989 | Cohen | |
| 4,897,715 A | 1/1990 | Beamon, III | |
| 4,902,116 A | 2/1990 | Ellis | |
| 4,988,976 A | 1/1991 | Lu | |
| 5,000,544 A | 3/1991 | Staveley | |
| 5,079,753 A | 1/1992 | Suggs | |
| 5,251,333 A | 10/1993 | Tsook | |
| 5,301,668 A | 4/1994 | Hales | |
| 5,420,828 A | 5/1995 | Geiger | |

(Continued)

FOREIGN PATENT DOCUMENTS

| | | |
|---|---|---|
| GB | 1167617 A | 10/1969 |
| WO | 2008055974 A1 | 5/2008 |

OTHER PUBLICATIONS

SportVue; Introducing—SportVue MC1, 2005 [http://www.ccbiketech.com/sportvue.asp].

(Continued)

*Primary Examiner* — Bumsuk Won
*Assistant Examiner* — Collin X Beatty
(74) *Attorney, Agent, or Firm* — Lorenz & Kopf, LLP (57) ABSTRACT

Provided is a compact display system and method for creating, with minimal volume, a focused, high quality, full color, large FOV virtual image characterized by eye-limited spatial resolution. The provided compact display (i) enables a flexible range of eye relief, and (ii) enables a large exit pupil.

15 Claims, 7 Drawing Sheets

(56) References Cited

U.S. PATENT DOCUMENTS

| | | | |
|---|---|---|---|
| 5,453,877 | A | 9/1995 | Gerbe et al. |
| 5,537,092 | A | 7/1996 | Suzuki et al. |
| 5,856,811 | A | 1/1999 | Shih et al. |
| 6,008,780 | A | 12/1999 | Clarke et al. |
| 6,140,980 | A | 10/2000 | Spitzer et al. |
| 6,157,352 | A | 12/2000 | Kollin et al. |
| 6,212,020 | B1 | 4/2001 | Ahlgren et al. |
| 6,230,327 | B1 | 5/2001 | Briand et al. |
| 6,388,638 | B2 | 5/2002 | Fukushima et al. |
| 6,483,646 | B2 | 11/2002 | Scott et al. |
| 6,747,611 | B1 | 6/2004 | Budd et al. |
| 6,934,633 | B1 | 8/2005 | Gallagher et al. |
| 7,477,207 | B2 | 1/2009 | Estep |
| 7,542,210 | B2 | 6/2009 | Chirieleison, Sr. |
| 8,952,889 | B2 | 2/2015 | Jacobsen et al. |
| 8,988,463 | B2 | 3/2015 | Stone Perez et al. |
| 9,581,818 | B2 * | 2/2017 | Suzuki ............... G02B 27/0172 |
| 2010/0096491 | A1 | 4/2010 | Whitelaw et al. |
| 2011/0221656 | A1 * | 9/2011 | Haddick ............ G02B 27/017 345/8 |
| 2012/0165676 | A1 | 6/2012 | Njemanze |
| 2012/0235902 | A1 | 9/2012 | Eisenhardt et al. |
| 2013/0044043 | A1 | 2/2013 | Abdollahi et al. |
| 2013/0222384 | A1 * | 8/2013 | Futterer ............... G02B 5/32 345/426 |
| 2013/0305437 | A1 | 11/2013 | Weller et al. |
| 2014/0009367 | A1 | 1/2014 | Lvovskiy et al. |
| 2014/0118829 | A1 | 5/2014 | Ma et al. |
| 2015/0002375 | A1 | 1/2015 | Williams |
| 2015/0277129 | A1 * | 10/2015 | Hua .................. G02B 27/0101 359/462 |
| 2016/0109710 | A1 * | 4/2016 | Smith ............... G02B 27/0172 359/633 |
| 2016/0178912 | A1 * | 6/2016 | Kusuda ............. G02B 27/0172 359/630 |
| 2016/0327797 | A1 * | 11/2016 | Bailey ................ G02B 27/0172 |

OTHER PUBLICATIONS

Nuviz; The first Head-Up Display for Motorcycle Helmets, Aug. 31, 2013 [https://www.kickstarter.com/projects/nuviz/the-first-head-up-display-for-motorcycle-helmets].

Hodgson; Requirements and Potential for Enhanced EVA Information Interfaces; SAE International, Jan. 2013 [http://mvl.mit.edu/MVLpubs/Hodgson2003.pdf].

Elbit; Displays: Color helmet-mounted display for Air Force CV-22 tiltrotor special-ops aircraft to come from Elbit Systems, Jan. 1, 2012 [http://www.militaryaerospace.com/articles/print/volume-23/issue-1/product-applications/displays-color-helmet-mounted-display-for-air-force-cv-22-tiltrotorspecial-ops-aircraft-to-come-from-elbit-systems.html].

Mardon, A.A.; The Utilization of Helmet Mounted Display (HMO) in Space Extra-Vehicular Suits and Lunar Extra-Vehicular Surface Suits, University of North Dakota, 1992 [http://articles.adsabs.harvard.edu/full/seri/LPI../0023//0000839.000.html].

Graziosi, D. et al.; I-Suit Advanced Spacesuit Design Improvements and Performance Testing, ILC Dover, Inc., 2003 [http://spacecraft.ssl.umd.edu/design_lib/ICES03-2443.I-Suit_tests.pdf].

Dillow, C.; NASA's Next-Gen Spacesuit Could Have an In-Helmet Display, Recon Instruments, Jun. 3, 2011 [http://www.popsci.com/technology/article/2011-06/nasas-next-gen-spacesuit-could-have-helmet-display].

Recon Jet; ReconJet The first heads up display for sports, Jan. 2014 [http://reconinstruments.com/products/jet].

USPTO Notice of Allowance for U.S. Appl. No. 14/327,641 dated Aug. 4, 2016.

USPTO Final Office Action for U.S. Appl. No. 14/327,641; dated Apr. 27, 2016.

USPTO Office Action for U.S. Appl. No. 14/327,641; dated Nov. 24, 2015.

* cited by examiner

SYSTEM AND METHOD FOR A COMPACT DISPLAY

TECHNICAL FIELD

Embodiments of the subject matter described herein relate generally to display systems and, more particularly, to a compact display system capable of providing a high quality large screen virtual image.

BACKGROUND

Large screen display images, such as those provided by contemporary large screen televisions and large computer monitors, are popular for a number of reasons. One reason for large screen image appeal is the ability to present more detail and a larger apparent field of view (FOV). However, the large FOV image generally comes with a tradeoff against space; large screen display systems typically require a big spatial footprint for accommodating the required amount of display electronics, drive electronics, and the plurality of imaging optics necessary to produce the large screen image. Examples of such imaging optics can include an array of electro-optic pixels such as an active matrix LCD or OLED panel for direct viewing, or a projector and screen for large screen projection.

The distance between the pupil of the viewer and the output surface of the imaging optics of a display system is referred to as the "eye relief." The range of valid locations from which a viewer views an image can be referred to as an eye box. In addition to occupying a big spatial footprint, display systems optimized to generate large FOV images are typically characterized by having a large eye relief and a large eye box. Overall, display system applications span a wide range of eye relief and eye box requirements; for example, from centimeters for a near-to-eye (NTE) display, to multiple meters for a large screen television.

There are several significant display system applications characterized by "mid-range" eye relief and eye box requirements. Examples of such "mid-range display systems" include: head up display systems (HUDs); display systems for instruments such as hand-held devices, medical equipment and portable test equipment; automotive applications; and personal media players. Compared to displays mounted in a fixed relationship to the viewer's head, mid-range display systems typically require a more flexible range of eye relief distance and a larger eye box. As each of these mid-range applications evolves, there is an increasing design expectation that the optical performance of those display systems shall provide high quality, high resolution, full color, and large FOV images. However, traditional large screen display systems typically cannot provide the combination of optical performance and flexibility that mid-range applications require, while keeping within the available space/volume for the hardware.

In response to the foregoing, a compact display system and method for creating a high quality, high spatial frequency, large FOV virtual image at a mid-range eye relief, while occupying minimal volume is desirable. The desirable compact display (i) enables a flexible range of eye relief, and (ii) enables a large eye box.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A display system for creating virtual images is provided. The display system comprises: an image source configured to receive image data and generate a real display image therefrom; and an optical assembly coupled to the image source and comprising an exit surface, the optical assembly configured to create a virtual image of the real display image, such that, when viewed from a predetermined eye-pupil within a predetermined pupil that is separated a predetermined eye relief from the exit surface, the virtual image comprises optical qualities of a predetermined field of view (FOV) of ten degrees or larger that is substantially unvignetted, a predetermined center of the field of view (CFOV), appearing to be in focus at an accommodation distance greater than or equal to twice the predetermined eye relief from the predetermined pupil, and eye-limited spatial resolution at the predetermined FOV; and wherein the display system has a display system depth behind the exit surface toward the predetermined CFOV that is less than or substantially equal to the predetermined eye relief.

A method for creating virtual images is also provided. The method comprises: enclosing an image source and optical assembly within a housing having a housing depth of not more than 86 millimeters and a housing height of not more than 56 millimeters; receiving, by the image source, image data; generating, by the image source, a real display image based on the image data; and creating, with the optical assembly, a virtual image of the real display image, wherein, when viewed from a valid viewing location that is separated a predetermined eye relief from the optical assembly, the predetermined eye relief being greater than the housing depth, the virtual image appears in focus and comprises optical qualities of (i) a predetermined field of view (FOV), (ii) a predetermined center of the field of view (CFOV), and (iii) eye-limited full-color spatial resolution.

Also provided is a display system for creating virtual images, comprising: an image source configured to receive image data and generate a real display image therefrom; and an optical assembly coupled to the image source and comprising an exit surface, the optical assembly configured to create, from a perspective of a valid viewing location, a focused virtual image of the real display image, the virtual image comprising an optical quality of full-color spatial resolution; and wherein the valid viewing location is located at least 100 millimeters from the exit surface and is one of a plurality of valid viewing locations within a volume referred to as a predetermined eye box, the predetermined eye box comprising a predetermined pupil of at least 20 millimeters.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to graphics and image processing, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices. Such operations, tasks, and functions are sometimes referred to as being processor-executed, computer-executed, computerized, software-implemented, or computer-implemented. In practice, one or more processor devices can carry out the described operations, tasks, and functions by manipulating electrical signals representing data bits at memory locations in the processor electronics of the display system, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiments described herein are merely examples serving as a guide for implementing the novel systems and methods herein on any display system in any terrestrial, water, hazardous atmosphere, avionics, or astronautics application. It is readily appreciated that display systems may be incorporated into various applications, such as protective suits, and as such, are designed to meet a plurality of environmental and safety standards beyond the scope of the examples presented below. Accordingly, the examples presented herein are intended as non-limiting.

For a given optical system within a display system, the image light rays that are produced may have an associated high performance region/volume wherein the highest quality or most optimal image may be viewed with the eye(s), and wherein the largest apparent field of view (FOV) may be observed. For example, much work has gone into expanding the range of angles from which direct view active matrix liquid crystal displays (AMLCDs) can be viewed without sacrificing image contrast. In the case of collimated, or virtual image systems, much effort has gone into expanding the FOV and viewing zone, or "eye box", while simultaneously minimizing the size and/or weight based on the needs of the application. In this latter case, image quality has often been treated as a lower priority. The embodiments described herein present optical systems characterized in part by an emphasis on creating a high quality virtual image for viewing from a predetermined (sized and shaped) eye box at a predetermined location. Outside of the eye box, the quality of the produced virtual image may be inferior and the apparent field of view (FOV) may be reduced. The embodiments are characterized by: eye relief, eye box, FOV, and several other features described hereinbelow. The compact display system described below may be employed alone in applications, or may be employed in multiple instances; for example, two instances may be employed to create binocular images, both for viewing comfort and for additional functionality such as the option to provide three dimensional (3D) stereoscopic images. A plurality of instances of the compact display may be employed to provide still further options. These concepts are described more fully below.

Figure 1:
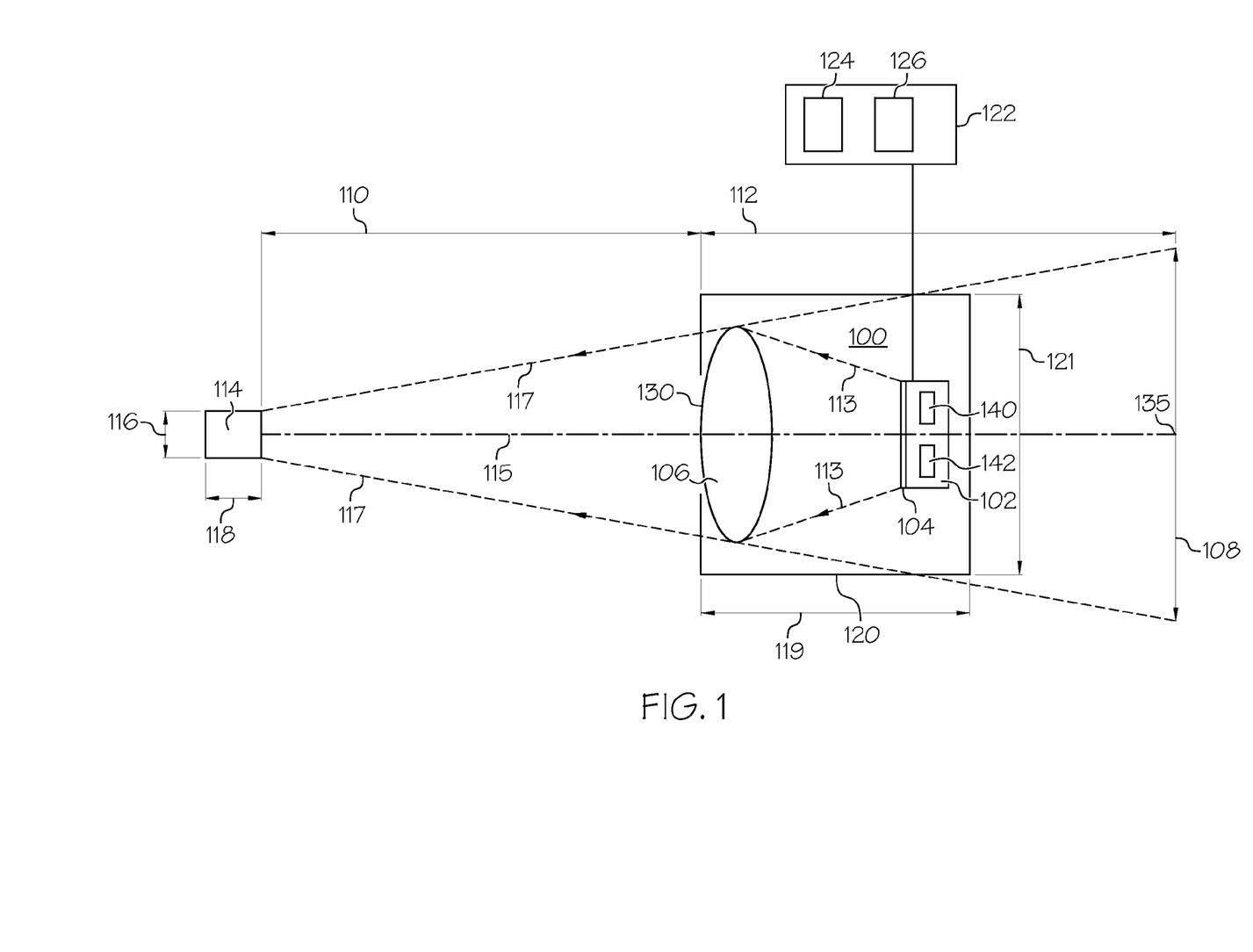
FIG. 1 is a simplified illustration of a compact display system according to an exemplary embodiment.

FIG. 1 is a simplified illustration of a compact display system 100 according to an exemplary embodiment. Within compact display system 100, an image source 102 comprises display device 140 and drive electronics 142. Image source 102 produces a real display image 104, where the descriptor "real" refers to an image that, if viewed directly, would appear to be located at the image source. Optical assembly 106 creates, from the perspective of an eye box 114, a two-dimensional or three-dimensional virtual image 108 of the real display image 104. The virtual image 108 appears on an accommodation plane located at a distance of eye relief 110 plus distance 112 from the eye box 114 (the image/accommodation distance). The term FOV refers to a range of angles, unlabeled, about the CFOV that comprise some or all of the virtual image 108. Objects in FIG. 1, such as the image light rays 113, and light rays 117, are depicted in two dimensions for simplifying purposes, but it is readily understood that, in practice, these objects may occupy volumes of rotation, and may not have sharp boundaries.

The virtual image 108 is representative of the real display image 104 generated by the image source 102. The virtual image 108 is "virtual" in that it exists in an inaccessible region from where the light appears to be emanating, thereby not appearing to be located coincident with image source 102. The virtual image 108 is created in high optical quality, comprising the optical qualities of a predetermined FOV, high resolution or spatial frequency, appearing to be focused at a predetermined image/accommodation distance that is greater than the physical distance from the eye to the real display image 104, and may meet any of numerous design criteria. Furthermore, the virtual image 108 may be full color, meaning that it can provide a significant range of visually perceivable chromaticities as depicted on a standard chromaticity diagram, as known in the art; such chromaticities are typically described as red, green and blue in appearance, as well as mixtures of those colors. Eye relief 110 plus the distance 112 provides the image/accommodation distance (from a viewer to the focused virtual image 108), also known as the virtual image distance.

Although referred to as a "box," in practice, the eye box 114 may be any predetermined volume, size, and shape appropriate for an application. Additionally, the location/distance of valid viewing locations within the eye box from the exit surface 130 (eye relief) may be predetermined as appropriate for an application. Typically, the predetermined eye box 114 is further designed to include a predetermined pupil 116 of a predetermined size having a center point on an axis that is coaxial with other features of the compact display system 100. The predetermined pupil 116 may represent an area associated with a cross-sectional slice through the predetermined eye box, having a corresponding eye relief. Centerline 115 represents a coaxial axis of rotation or symmetry for the predetermined eye box 114, at least one lens (not shown) in the optical assembly 106, and the virtual image 108. From the predetermined eye box 114, a viewer may comfortably view the focused virtual image 108 with a predetermined FOV. In the exemplary embodiment, the predetermined eye box 114 has a predetermined pupil 116 of at least twenty millimeters in diameter and a corresponding eye relief 110 of at least 50 millimeters. A preferable range of eye relief 110 is from about 75 millimeters to 125 millimeters to about 250 millimeters.

Typical virtual image display systems cannot be described by a single FOV parameter, and will comprise multiple optical qualities. As discussed herein, all FOV references for a single compact display system 100 will be considered to be relative to the respective display system. Such a virtual image display system has a predetermined center of field of view (CFOV) 135. An axis is generally associated with the CFOV 135. In the exemplary embodiment, the real display image 104 is rectangular in its layout, and hence the effective FOV range (i.e., the FOV range with virtual image content) will vary with the polar angle within the corresponding virtual image and around the axis associated with the CFOV 135.

The largest image angle with respect to the CFOV 135, typically at a corner of the virtual image 108, identifies what we will refer to herein as a total field of view (TFOV), where the TFOV is twice that largest angle. In the exemplary embodiment, with the rectangular image centered on the CFOV 135, the TFOV would be the virtual angle subtended between opposite corners of the virtual image. The predetermined FOV is typically equal to or less than the TFOV, and represents a FOV of interest for an intended purpose. That purpose can vary, and the predetermined FOV can be selected accordingly. For example, the predetermined FOV can be application dependent, can be the range over which the high image quality metrics are evaluated or met, can represent the range of angles over which the lens design is optimized, or can be selected (predetermined) for other reasons. In the exemplary embodiment the predetermined FOV may range from about 10 degrees to at least 24, e.g., 10, 12, 14, 16, 18, 20, 24, 30 degrees and so forth, and the FOV are centered on the predetermined CFOV 135.

Along with the predetermined FOV and predetermined CFOV 135, there are other corresponding parameters, or optical qualities, that may be predetermined as appropriate for the intended application. These can include, without limitation, the predetermined eye box and associated characteristics, the predetermined pupil and its corresponding predetermined eye relief, a predetermined image distance, and a predetermined eye-pupil with an associated eye-pupil diameter. To relate these predetermined parameters to each other, we require that any virtual image content within the predetermined FOV be visible (i.e., substantially unvignetted) from any point contained within the predetermined pupil and predetermined eye box. This means that some or all of the virtual image may still be visible from points outside the predetermined eye box and predetermined pupil. There may also be virtual image content outside of the predetermined FOV that is not visible from the entire predetermined pupil or eye box, though such image content may be visible from at least a portion of the predetermined pupil or eye box. Of course, there could be portions of the predetermined FOV for which no image content is provided, for example due to the shape and size of the real display image 104, and these portions would not be considered in the above requirement.

In some embodiments, the image distance (the image distance is also referred to as an accommodation distance) is predetermined and appears to be from about five feet away from the viewer to infinity. In other embodiments, the predetermined image distance might correspond substantially with arms-length viewing. Multiple display devices may be utilized to provide these, and possibly other, different image distances in one instance of a compact display system 100 (referred to as multiple accommodation planes, and described in more detail in connection with FIG. 4).

The optical assembly 106 and the image source 102 are configured to cooperate to create the virtual image 108 with the desired image qualities. An input surface of the optical assembly 106 faces the image source 102, having unobscured access to real display images 104 generated by the image source 102. Generated image light rays 113 are shown impinging on the input surface of the optical assembly 106; optical assembly 106 deflects the image light rays 113 such that the light rays 117 leaving its exit surface 130, when viewed from the predetermined eye box 114, present a virtual image 108 that appears to be in focus, with the following qualities: a predetermined FOV, a predetermined CFOV 135, and eye-limited spatial frequency and resolution, including full color images. As used herein, "eye-limited" means that the optics of the embodiment is of higher performance in certain respects than the optics of the typical human eye (eye-limited spatial frequency is described in more detail in connection with FIG. 7).

Embodiments of the compact display support both monochromatic and full color virtual images; optical assembly 106 may be configured to maximize color image quality or to maximize monochromatic image quality, in order to minimize the overall size of compact display system 100. As is well understood, the optimization for high image quality becomes significantly more challenging as the spectral range of wavelengths being presented is increased, and the present invention addresses this challenge while simultaneously keeping the display system compact and having high performance for other characteristics as well.

Image source 102 receives image data and selectively renders a real display image 104 based on the image data, which contains various types of textual, graphic, video and/or iconic information. For simplifying purposes, the various textual, graphic, and/or iconic visual image content generated by image source 102 may be referred to collectively as a "real image." Image source 102 may comprise any one of numerous known planar or non-planar display devices 140 suitable for rendering textual, graphic, and/or iconic information in a format viewable by the user. Non-limiting examples of such display devices 140 include various light engine displays, organic LED displays (OLED, AMOLED), liquid crystal displays (LCD, AMLCD, LCOS), compact projection displays (e.g. DLP with etendue-enhancing screen), discrete elements, etc. The size of such displays utilized will vary based on the overall system size and related characteristics. In some embodiments, a compact small-format display device 140, sometimes referred to as a micro display, is used. While some display devices such as AMOLEDs are emissive in nature, other devices such as liquid crystal displays modulate light and will be used with a compact backlight, or frontlight (e.g., in the case of LCOS). In addition, image source 102 comprises suitable drive electronics 142 to command the one or more image display devices 140.

Image source 102 and optical assembly 106 may be secured by, surrounded by, or mounted within, housing 120; housing 120 may, in turn, provide a mounting capability to other surfaces or objects. Regardless of the form that housing 120 takes, it does not obscure exit surface 130 of optical assembly 106 and is defined at least in part by a housing depth 119. The compact display system 100 is physically compact, and embodiments fit within housing 120, which in a preferred embodiment occupies not more than 86 millimeters depth 119 and not more than 56 millimeters height 121. In this embodiment the display system depth is substantially equal to the housing depth 119, and the display system height and width correspond to the housing height 121 and housing width, respectively.

In an embodiment, a display computer 122 provides image data to the image source 102. Image data provides data such as, the image pixel information, image color information, and commands required to command the drive electronics 142 and display functions of the image source 102. Display computer 122 may be in communication with various electronic systems included in a larger system, portions of which may reside remotely from housing 120 and display computer 122.

Display computer 122 typically comprises a processor 124 and memory 126. The processor 124 may be implemented or realized with at least one general purpose processor device, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

Memory 126 can be realized as RAM memory, flash memory, EPROM memory, EEPROM memory, registers, a hard disk, a removable disk, a CD-ROM, or any other form of storage medium known in the art. In this regard, the memory 126 can be coupled to the processor 124 such that the processor 124 can read information from, and write information to, the memory 126. In the alternative, the memory 126 may be integral to the processor 124. In practice, a functional or logical module/component of the system described here might be realized using program code that is maintained in the memory. Moreover, the memory 126 can be used to store data utilized to support the operation of the system, as will become apparent from the following description. No matter how display computer 122 is specifically implemented, it is in operable communication (via direct line or wireless) with image source 102.

Figure 2:
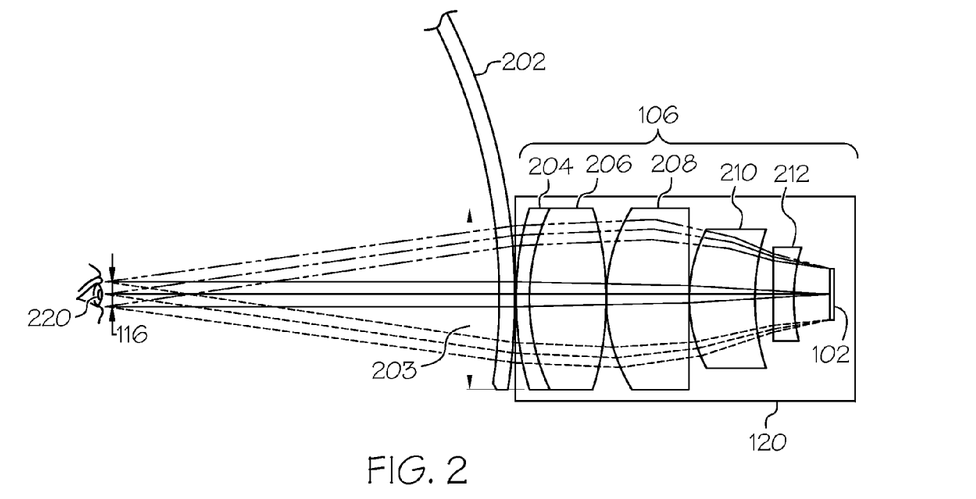
FIG. 2 is an illustration of a compact display system coupled to a face plate, according to an exemplary embodiment.
Figure 3:
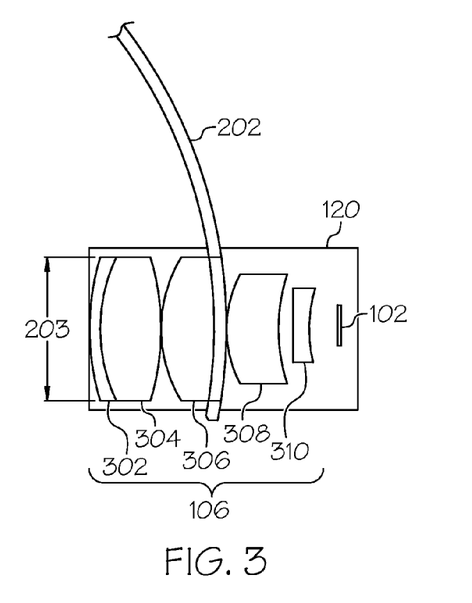
FIG. 3 is an illustration of a compact display system coupled to a face plate, according to another exemplary embodiment.
Figure 4:
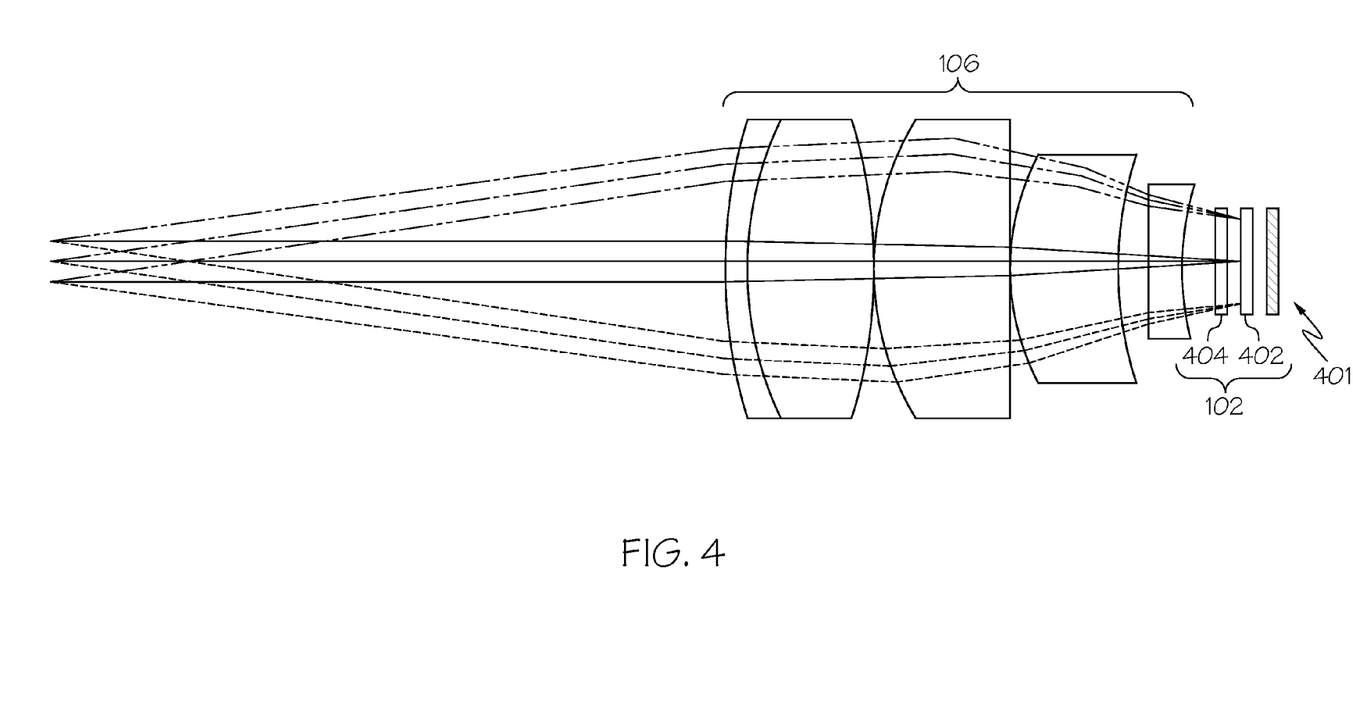
FIG. 4 is an illustration of a compact display system with a plurality of stacked micro display devices, according to yet another exemplary embodiment.
Figure 5:
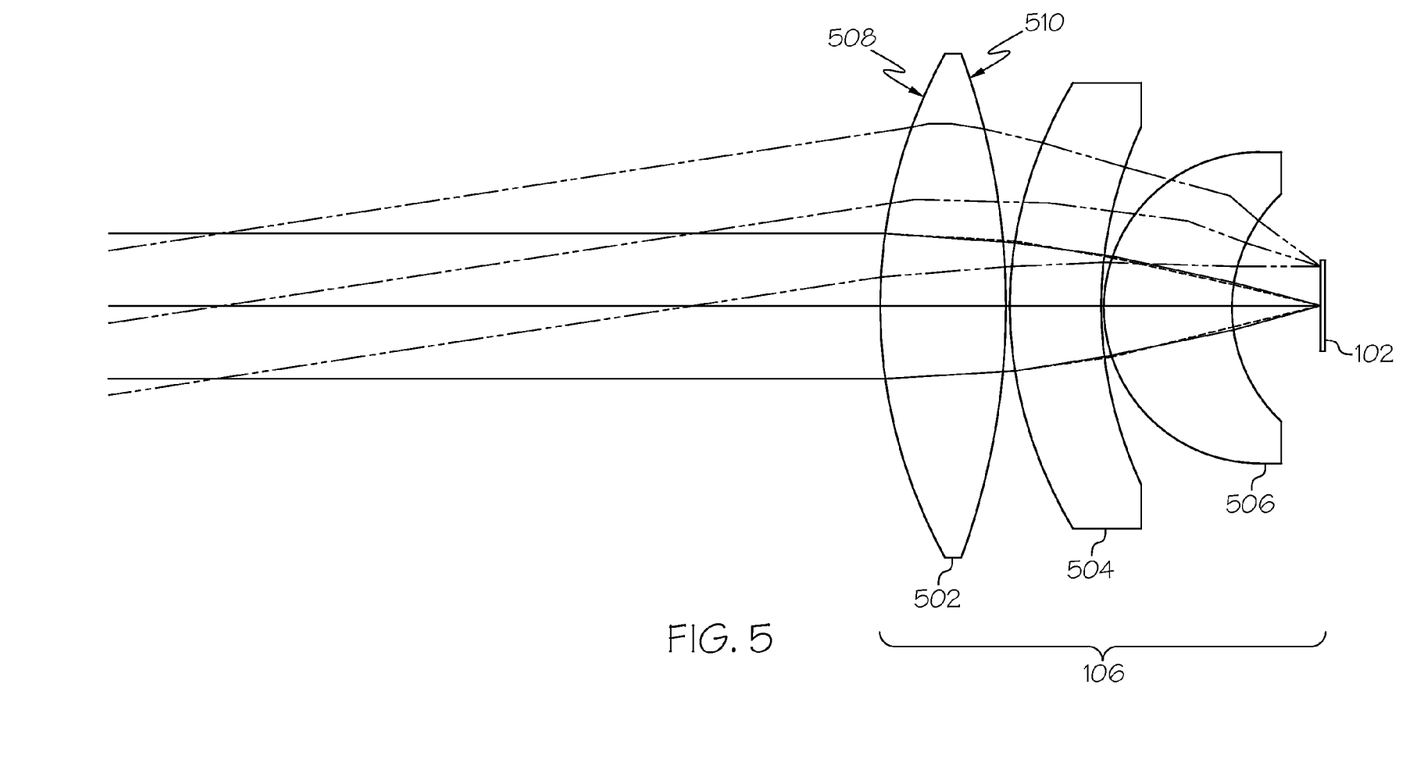
FIG. 5 is an illustration of a compact display system comprising a variety of different lens types, according to another exemplary embodiment.

FIGS. 2-6 depict various embodiments of compact display system 100 highlighting, inter alia, lenses of the optical assembly 106. In order to ensure that the virtual image 108 has the desired optical qualities: appears to be in focus, with a predetermined FOV, a predetermined center of field of view (CFOV) 135, and eye-limited spatial frequency, various configurations and types of lenses may be employed. Notably, each embodiment depicted employs "non-folded" optics situated within a compact space. As an overview: FIG. 2 and FIG. 3 may be viewed together; they illustrate compact display system embodiments in combination with optional inner and outer face plate mounting/coupling variations, both of which allow for the electronics to be placed outside of a helmet for safety purposes; FIG. 4 depicts display device 140 comprising a plurality of additional, transparent, stacked display devices; and FIG. 5 depicts the use of a non-planar display, with fewer lenses than the planar embodiments. FIGS. 2-6 are not necessarily to scale and are intended to aid in the understanding of various novel features and their advantages; however it is readily appreciated that the features may be differently combined while still falling within the scope of the invention. Each figure is described in more detail below.

FIG. 2 is an illustration of a compact display system 100, within housing 120, coupled to optional face plate 202, according to an exemplary embodiment. Eye-pupil 220 is shown within predetermined pupil 116. Optical assembly 106 comprises five lenses (first lens 204, lens 206, lens 208, lens 210, and lens 212). First lens 204 and lens 206 form a cemented doublet lens; cemented doublets with disparate indices of refraction and/or dispersion foster optimization of color correction within the optical assembly 106, supporting the objective of displaying high quality full color images.

As to the use of a plurality of lenses, the size, dimension, and optical qualities of each lens within optical assembly 106 may be selected to produce a high quality, high optical transmission (greater than 85% optical transmission) virtual image 108 from the perspective of the eye box 114, according to a desired application. By providing high optical transmission, the provided embodiments advantageously relax brightness requirements on the real display image 104. By employing bilaterally symmetrical aperture shaped lenses (around a coaxial centerline such as centerline 115), the cross sectional area of the compact display system 100 is minimized. Lens variations include, but are not limited to: lenses with spherical or aspheric surfaces; lenses with diffractive surfaces; cemented doublets; holograms; lenses that allow for electro-mechanical or mechanical rotational adjustment; and the like. In some embodiments, one or more of the plurality of lenses comprise planar regions with mounting pads, to foster minimal design geometries. In the embodiments shown in FIG. 2 and FIG. 3, a compact display system 100 is configured such that optical assembly 106 comprises three positive powered lenses (one being a cemented doublet lens) and a negative lens, followed by a planar display device 140.

Optional face plate 202 may take any shape, such as planar or curved. The region 203 of face plate 202 has an optical quality that enables it to cooperate with the optical assembly 106 such that it does not lead to significant reduction of image quality provided by compact display system 100. As such, region 203 may be substantially optically neutral, or may comprise certain optical qualities of a lens (this concept is more apparent in FIG. 3). While FIG. 2 shows region 203 as being substantially perpendicular to the coaxial axis of optical assembly 106, the extended eye relief 110 provided by various embodiments advantageously provide the freedom to position, or reposition, the compact display system 100 with respect to region 203.

FIG. 3 is an illustration of a compact display system 100, optionally coupled to face plate 202, according to another exemplary embodiment. First lens 302 and lens 304 form a cemented doublet. In FIG. 3, face plate 202 is shown intersecting housing 120, whereby region 203 is located among the plurality of lenses that comprise optical assembly 106. The configuration of FIG. 3 may reduce the distance of the eye relief 110 required in face plate designs, and also reduces the protrusion of compact display system 100 from the outside of a face plate 202.

FIG. 4 is an illustration of a compact display system 100 with wherein display device 140 comprises a plurality of stacked display devices, for example micro displays, according to yet another exemplary embodiment. Display device 140 is comprised of a first (primary) display device 401, and additional transparent, stacked display devices 402 and 404. In this embodiment, drive electronics 142 commands each of the plurality of display devices within display device 140, in response to image data from display computer 122. Each of first display device 401 and additional transparent stacked display devices 402 and 404 generates a portion of a combined real display image 104.

Stacked transparent display devices (including, but not limited to: OLEDs and LCDs, other transparent display devices known in the art, and variations therefrom as a result of continued development and improvement) may be utilized to provide the user with multiple, electronically selectable, accommodation planes from which to view a respective virtual image, since accommodation distance (eye relief 110 plus the distance 112) is a function of the location of the accommodation plane associated with a respective real display image 104. Implemented this way, one accommodation plane may provide a first virtual image 108 optimized for a FOV and associated optical qualities at arm's length, and another accommodation plane may provide a second virtual image (not shown) optimized for a second FOV and second set of associated optical qualities afar. The stacked display devices are coupled to each other using any method common in the art, such as but not limited to, lamination. The provision of multiple, possibly many, accommodation planes can enable several features and benefits, such as enhanced information content, redundancy, depth cues associated with accommodation distance and visual parallax, or user-selectable accommodation distance(s) without the need for physical focus adjustments. The latter feature can provide advantages in minimizing system size as well as accommodating different visual needs of operators when a manual adjustment is inconvenient such as in the case of wearing protective gear.

FIG. 5 is an illustration of a compact display system comprising a variety of different lens types, according to another exemplary embodiment. Optical assembly 106 comprises lens 502, lens 504, and lens 506. Lens 502 comprises one aspheric surface 508 and one diffractive surface 510. Image source 102 comprises a non-planar display device 140 or micro display device. As can be readily observed in this embodiment, the use of these alternate lens types, as well as a non-planar display device 140 in image source 102 may reduce the number of lenses needed, e.g., from five to three in this embodiment, providing a more compact, in-line optical system and therefore a more compact display system 100 while still delivering high image quality.

Figure 6:
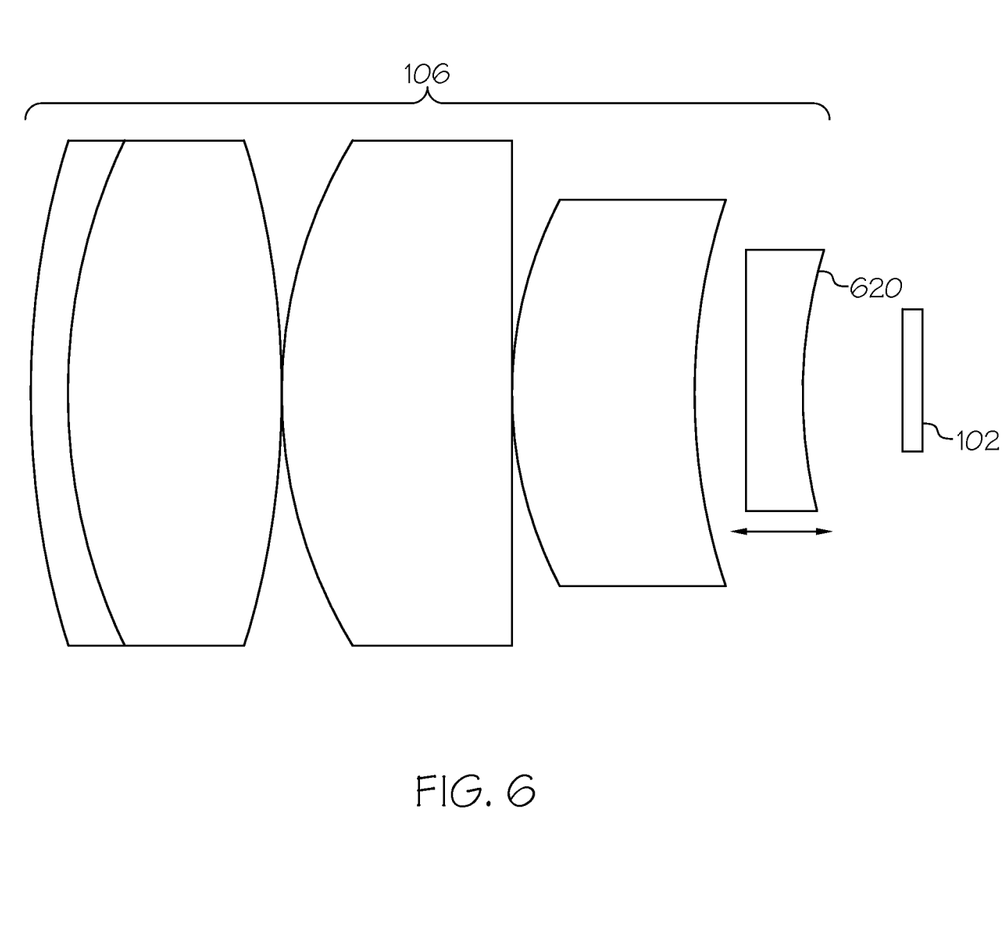
FIG. 6 is an illustration of a compact display system having a lens configured for easy rotational focus, according to still another exemplary embodiment.

FIG. 6 is an illustration of a compact display system having a lens 620 configured for easy rotational focus, according to still another exemplary embodiment. In an embodiment, lens 620 is part of optical assembly 106, and has a circular aperture to allow for rotational adjustment. The easy rotational focus adjustment, provided via electro-mechanical or manual control, e.g. in conjunction with mechanical screw-style threads, allows a viewer to optimize visual acuity when viewing the virtual image 108 at an adjustable virtual image distance. In the case of the FIG. 6 embodiment, a focus adjustment of at least 2.5 millimeters is provided. It is preferred that optical assembly 106 is capable of delivering high image quality over a range of focus, or accommodation distances, rather than requiring strictly collimated light with an infinite accommodation distance. This enables embodiments having a focus that may be changed, for example by adjusting relative separations between components within optical assembly 106 and/or image source 102.

Figure 7:
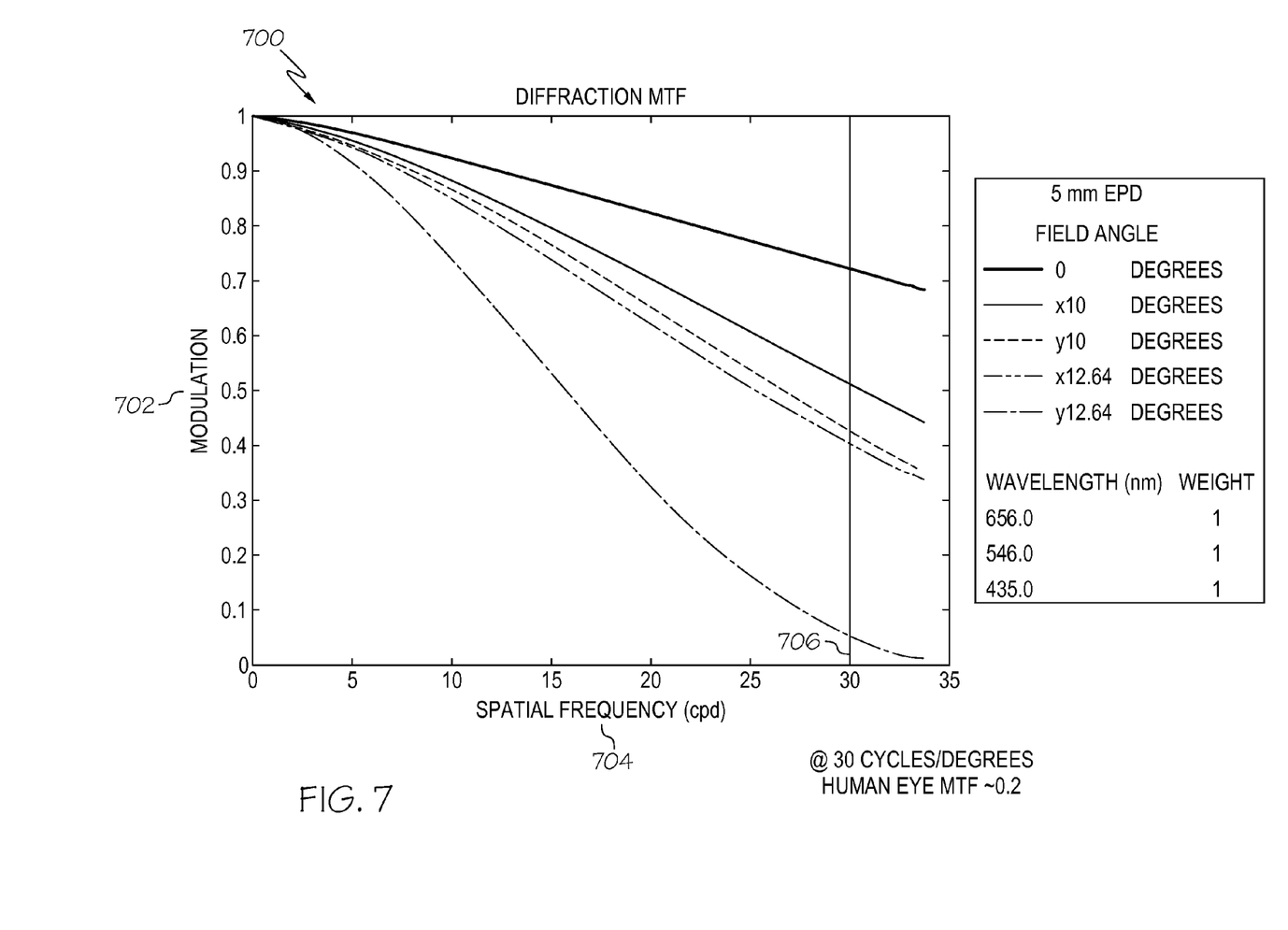
FIG. 7 is a graph showing predicted performance vs. spatial frequency, according to an exemplary embodiment.

FIG. 7 is a graph 700 showing predicted spatial frequency performance for an exemplary lens design consistent with the lens arrangement shown in FIG. 2 and FIG. 6, and is used to illustrate this concept. A modulation transfer function (MTF), graphing modulation (702) vs. spatial frequency (704), is one way to compare optical quality. FIG. 7 depicts the calculated MTF of this embodiment, wherein virtual image spatial frequency is measured in cycles per degree (cpd). The optics of a human eye generally leads to analogous MTF curves for foveal vision, where the eye's resolving capability is at its maximum. As an exemplary comparison, at thirty cycles per degree (706) and an iris opening (eye-pupil) of approximately 5 mm, the human eye (visual system) is often considered to have an MTF of approximately 0.2, or possibly even lower when full-color performance and associated aberrations are included. In comparison, the graph shows that the MTF of the embodiment at 30 cpd is above 0.2, and more specifically above 0.4, for field angles of ten degrees or less from the CFOV 135 (representing a FOV of twice that, or twenty degrees or less), including chromatic effects representative of full color images. Therefore, at thirty cycles per degree (706), because the optical assembly of the exemplary embodiment is of higher performance than the human eye (visual system), the spatial frequency observable to a viewer is more limited by the optics of his own visual system than by the MTF of the color-corrected optical assembly, therefore the optical assembly provides "eye-limited" spatial frequency or spatial resolution and eye limited full-color spatial resolution.

It is also well understood that MTF of the human visual system can vary with the eye-pupil (iris) diameter, as the resulting MTF can depend upon relative tradeoffs between diffraction, aberrations and potentially other effects. The MTF performance of the optical assembly 106 will also tend to vary with the eye-pupil diameter, and these MTF considerations can be taken into account to assure high image quality to the viewer for the predetermined eye-pupil. In an embodiment, the eye and its associated iris opening are free to move with respect to the predetermined pupil 116. Eye-limited spatial frequency in this embodiment will be achieved from the predetermined eye-pupil 220 and with its associated eye-pupil diameter, and preferably when viewed from any eye-pupil location within predetermined pupil 116 and having the eye-pupil diameter associated with the predetermined eye-pupil 220.

Providing optics with eye-limited MTF ensures that the image data displayed by the image source 102 will be viewable with minimal, if any, degradation of the spatial frequency content within that image data. In other words, the viewer will be presented with an eye-limited view of the image data, spread over the respective FOV. This does not, of course, imply or require that the actual image data to be displayed will necessarily contain eye-limited spatial resolution content. To avoid degradation due to multiple sequential sampling operations, it is assumed that the display device 140 used in the image source 102 has the same number of pixels as the input image data being provided to that image source. For example, if the compact display system is to be supplied with a 1280×1024 pixel video signal, then the image source shall contain a matching 1280×1024 display device 140. Pixelated image data comprises data that has been sampled or generated for a particular pixel count, meaning that the image data provided will intrinsically contain spatial frequency harmonics associated with that sampling process. It is typically preferred that those harmonics are not readily apparent, i.e., are not seen by the eye. As the eye-limited MTF of the optical assembly can potentially preserve those harmonics, it is preferred that the image data pixel count or resolution be selected such that the harmonics are moved beyond the visual range, i.e., greater than 30 cpd or so. One "cycle", in this case, would consist of one pixel (bright) in combination with the gap (dark) between it and the next pixel, i.e. one cycle per pixel, so avoiding visibility of pixel substructure would suggest that the image data and matching image source should provide greater than 30 pixels per degree (ppd) when combined with the optical assembly 106. Lower pixel densities increase the likelihood that the viewer will notice the individual pixels or pixel patterns, analogous to sitting very close to an active matrix television display or desktop monitor. But the compact display system is doing what is expected of it, which is to enable eye-limited viewing of the input image data spread over the optical FOV. Higher image quality can be achieved by providing higher resolution image data, e.g., 40 or 50 ppd, along with a matching image source, still with eye-limited viewing of the spatial frequency and spatial resolution of the input image.

To take maximum advantage of this eye-limited compact display system approach, it is preferable to provide image data which itself is eye-limited in terms of its spatial information content when spread across the FOV. In this context, a minimum of two pixels are required to produce a single cycle (on-off), so this would suggest a minimum of 60 ppd to achieve 30 cpd. In this case, 30 cpd is sometimes referred to as the Nyquist frequency corresponding to a sampling rate of 60 ppd. It is commonly recommended that a somewhat higher pixel density (ppd) be utilized to reduce degradation and potential artifacts associated with sampling effects, aliasing, Moiré effects and the like. These guidelines, such as the historical "Kell factor" guidelines, are somewhat subjective and can vary with the detailed sampling geometries as well as optional techniques such as leveraging specific color subpixel geometries of the display device 140 within the image source 102 in the case of full-color pixels. While a more detailed analysis of these anti-aliasing effects and techniques is beyond the scope of the present discussion, a commonly accepted guideline is to increase the ppd by 10 to 15 percent or more above the sampling rate of twice the targeted Nyquist frequency. Hence the image data source and matching image source 102, in combination with the optical assembly 106, should deliver more than 30 ppd to minimize visible pixel artifacts, and preferably deliver 60 ppd, or more preferably around 66 to 70 ppd or higher in order to provide eye-limited spatial image detail to the viewer, whether monochrome or full-color. For example, this would suggest approximately 600-660 pixels or more across a 10 degree FOV, 1200-1320 pixels or more across 20 degrees, etc. Display devices 140 are currently available which have pixel counts in these ranges and higher.

Figure 8:
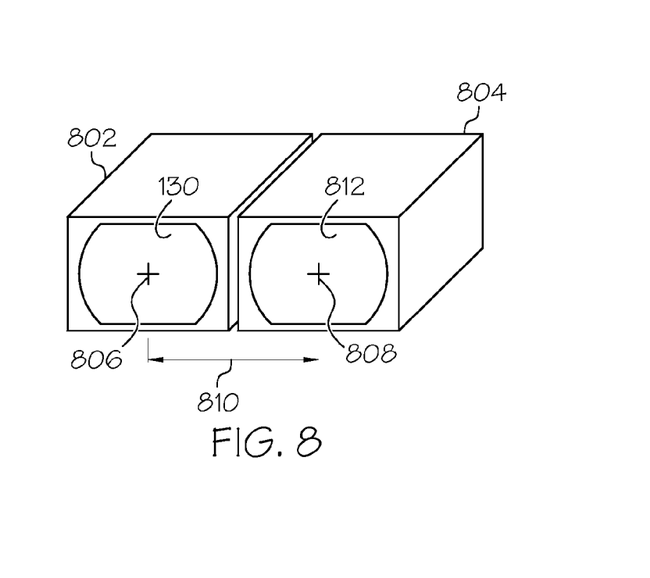
FIG. 8 is an illustration of two compact display systems cooperatively employed to enable binocular viewing of displayed images.
Figure 9:
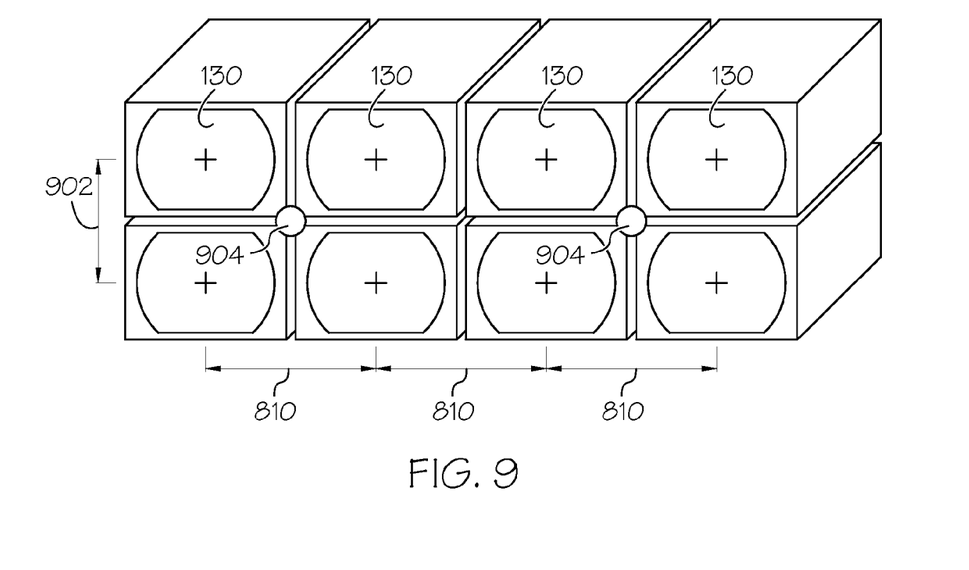
FIG. 9 is an illustration of 8 compact display systems cooperatively employed in yet another potential application.

FIGS. 8 and 9 depict two examples of applications in which two or more compact display systems 100 are cooperatively configured. FIG. 8 is an illustration of two compact display systems cooperatively configured to produce a binocular image, and possibly a three dimensional (3D) stereoscopic image. Compact display system 802 is configured alongside compact display system 804. The exit lens 812 is shown as truncated at certain positions around the lens perimeter, but this is optional. As described above, center points indicate a point where the axis passes through a compact display system; exit surface 130 has center point 806 and exit lens 812 has center point 808. Center points 806 and 808 may be designed to be separated a distance 810. In this embodiment, each compact display system can be used to display distinct, possibly unrelated virtual images, as separate monocular displays. In one application of this embodiment, distance 810 may equal, for example, a median adult interpupillary distance (IPD) of about 65 millimeters, in which case each display can be used to intentionally generate respective virtual images that overlap angularly and spatially at the image distance; such an application can be utilized for providing equivalent images to each eye, or binocular stereoscopic virtual images to the viewer, in addition to the option of separate monocular images. The use of a 65 millimeter separation, in combination with a large predetermined pupil for each, such as 20 millimeters, will readily bracket the vast majority of viewer IPD's, and the compact nature of the display system allows that separation to be readily achieved and maintained.

FIG. 9 is an illustration of a two-dimensional array of compact display systems; eight in this case, cooperatively employed in yet another potential application. Compact display systems are arranged horizontally as described in connection with FIG. 8 above, with another layer (in the vertical direction) of compact displays added. While shown and described as having substantially parallel axes, this is not a requirement. Separation distance 810 can again optionally allow for either monocular or binocular images to be presented. Separation distance 902 represents the vertical distance between center points, and can also take any value supported by the compact size of the display systems. The image presentation configuration is extremely flexible in that any single display can present a monocular image, and any adjacent pair of displays can present a binocular image. Optionally, sensors 904 may be added for detection of an eye in the predetermined eye box of each display. Detecting the presence of an eye in the eye box may be utilized for various applications, such as for determining, by a display processor, which compact display system (or systems) to send image data to, as well as the nature of the image data. The optional sensor(s) can also be used to reduce the luminance of display systems when they are not being viewed, both saving power and reducing heat generation within the display systems, and both of which may provide significant value in certain applications.

The compact display systems described herein provide additional benefits and advantages not yet described, and that can apply to both single and multiple displays system configurations such as in FIGS. 1-6 and FIGS. 8-9. The design can be scaled, if desired, to various sizes. While certain predetermined parameters and relationships may be desirably adjusted when dimensionally scaling the display system approach, alternate defining relationships can be used, for example by defining an exit lens dimension, such as an exit lens diameter, that is of sufficient size to span a predetermined FOV from a predetermined pupil and with a predetermined eye relief. The system can then be characterized in terms of the ratio of the display system depth to the exit lens diameter. In one exemplary embodiment where the predetermined pupil, predetermined eye relief and predetermined FOV are 20 mm in diameter, 70 mm, and 24 degrees respectively, the exit lens diameter can be calculated as the sum of the predetermined pupil diameter plus two times the predetermined eye relief times the tangent of half of the predetermined FOV angle, which indicates a minimum exit lens diameter of approximately 50 mm. Assuming a display system depth of 86 mm, the ratio of display system depth to exit lens diameter would be less than 86/50, or less than approximately 1.7. Yet another characterization for a specific optical assembly design would be to determine the effective focal length of the optical assembly, and to calculate the ratio of said effective focal length to the minimum exit lens diameter. In an embodiment where the effective focal length of the optical assembly is 45 mm, and the minimum exit lens is 50 mm, then the ratio of effective focal length to exit lens diameter would be less than approximately 0.9. Other relevant and predetermined optical qualities are also supported.

Another benefit of the compact display system embodiments presented herein is that the predetermined pupil can be chosen such that the presentation, or display, of the virtual image 108 is comfortable to view and remains private to the viewer. This can have advantages, for example, in any number of public data terminal applications where sensitive information is being viewed or entered. Yet another benefit of the presented embodiments is the ability to provide sufficient predetermined eye relief and predetermined eye box size so as to minimize or eliminate the likelihood of head strike or contact with facial features when positioning the eye(s) to view the virtual image(s), while at the same time minimizing obscuration of forward views when looking around the compact displays. While compact display system 100 has been described in the context of in-line viewing and non-folded optics within the compact display system 100, it should be further understood that the large range of eye relief provided can optionally be utilized to enable the insertion of a reflective element, e.g., a mirror or beamsplitter/combiner, external to the compact display assembly but within that eye relief distance to fold the optical path to the eye of the viewer, such as for a HUD or NTE type of see-through application.

It is readily appreciated that the various components of a compact display system 100 may be of any shape or volume, material, transparency or orientation that is suitable to meet the environmental and design requirements. Additionally, individual components of a compact display system 100 may be placed within or without a housing, at any location, and/or optionally mounted to a face plate. The compact display system 100 may be designed to operate with the right or left eye individually or two or more compact display systems 100 may be employed to provide a binocular, and/or stereoscopic virtual image 108.

Thus, a compact display system and method for creating, with minimal volume, a focused high quality, large FOV virtual image characterized by eye-limited spatial frequency has been provided. The provided compact display (i) enables a flexible range of eye relief, and (ii) enables a substantial eye box and pupil from which the virtual image can be viewed.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A display system for creating virtual images, comprising:
   an image source configured to receive image data and generate a real display image therefrom; and
   an optical assembly coupled to the image source and comprising an exit surface, the optical assembly configured to create a virtual image of the real display image, such that, when viewed from a predetermined eye-pupil within a predetermined pupil that is separated a predetermined eye relief from the exit surface, the virtual image comprises optical qualities of
   (i) a predetermined field of view (FOV) of ten degrees or larger that is substantially unvignetted,
   (ii) a predetermined center of the field of view (CFOV),
   (iii) appearing to be in focus at an accommodation distance greater than or equal to twice the predetermined eye relief, and
   (iv) eye-limited spatial resolution at the predetermined FOV;
   wherein the optical assembly comprises a first lens, a second lens, a third lens, and a fourth lens, the first lens, second lens and third lens each have positive refractive power, the fourth lens has negative refractive power and is nearest the first display device, and the first display device is planar; and wherein the display system has a display system depth behind the exit surface toward the predetermined CFOV that is less than or substantially equal to the predetermined eye relief.

2. The display system of claim 1, wherein the optical assembly is substantially coaxial with an axis associated with the predetermined CFOV.

3. The display system of claim 1, wherein the predetermined pupil is at least 20 millimeters in diameter.

4. The display system of claim 1, wherein the predetermined FOV is 24 degrees or larger.

5. The display system of claim 1, wherein the predetermined eye relief is within the range of about 50 mm to about 250 mm.

6. The display system of claim 1, wherein the predetermined eye relief is within the range of 75 mm to 125 mm.

7. The display system of claim 1, wherein the image source comprises:
a first display device; and
drive electronics coupled to the first display device, the drive electronics configured to (i) receive the image data and (ii) command the first display device to generate the real display image.

8. The display system of claim 1, further comprising a housing surrounding the image source and the optical assembly, wherein the housing does not obscure the exit surface of the optical assembly, and wherein a housing depth is not more than 86 millimeters and a housing height and a housing width are not more than 56 millimeters.

9. The display system of claim 1, further comprising a face plate, and wherein a housing is coupled to a region of the face plate, and wherein the region of the face plate comprises an optical quality that cooperates with the optical assembly.

10. The display system of claim 9, wherein the region of the face plate (i) intersects the housing and (ii) is located between the first lens and the image source.

11. The display system of claim 1, wherein the optical assembly comprises one or more of an aspheric surface, a diffractive surface, and a first display device that is non-planar.

12. The display system of claim 1, further comprising a transparent display device coupled to an exit surface side of the image source.

13. The display system of claim 1, wherein a lens within the optical assembly further comprises circular aperture to allow for rotational adjustment.

14. A display system for creating virtual images, comprising:
an image source configured to receive image data and generate a real display image therefrom; and
an optical assembly coupled to the image source and comprising an exit surface, the optical assembly configured to create a virtual image of the real display image, such that, when viewed from a predetermined eye-pupil within a predetermined pupil that is separated a predetermined eye relief from the exit surface, the virtual image comprises optical qualities of
(i) a predetermined field of view (FOV) of ten degrees or larger that is substantially unvignetted,
(ii) a predetermined center of the field of view (CFOV),
(iii) appearing to be in focus at an accommodation distance greater than or equal to twice the predetermined eye relief from the predetermined pupil, and
(iv) eye-limited spatial resolution at the predetermined FOV;
wherein the display system has a display system depth behind the exit surface toward the predetermined CFOV that is less than or substantially equal to the predetermined eye relief; and
a face plate having a housing coupled to a region of the face plate, wherein the region of the face plate comprises an optical quality that cooperates with the optical assembly, and wherein the region of the face plate (i) intersects the housing and (ii) is located between a first lens of the optical assembly and the image source.

15. The display system of claim 14, wherein the image source comprises:
a first display device that is planar and has an exit surface side;
a transparent display device coupled to the exit surface side of the first display device; and
drive electronics coupled to the first display device and the transparent display device, the drive electronics configured to (i) receive the image data and (ii) command the first display device to generate a first portion of the real display image and command the transparent display device to generate another portion of the real display image.

* * * * *